United States Patent [19]

Theurer et al.

[11] 4,027,397

[45] June 7, 1977

[54] MOBILE TRACK SURVEYING APPARATUS

[75] Inventors: Josef Theurer; Klaus Riessberger, both of Vienna, Austria

[73] Assignee: Franz Plasser Bahnbaumaschinen-Industrie-Gesellschaft m.b.H., Vienna, Austria

[22] Filed: Oct. 24, 1975

[21] Appl. No.: 625,486

[30] Foreign Application Priority Data

Dec. 9, 1974 Austria .............................. 9831/74

[52] U.S. Cl. .................................. 33/287; 33/1 Q; 33/146; 33/338
[51] Int. Cl.² ........................................ E01B 35/08
[58] Field of Search ............ 33/287, 1 Q, 144, 146, 33/338

[56] References Cited

UNITED STATES PATENTS

| 1,032,509 | 7/1912 | Scheider et al. ............... 33/338 |
| 1,457,425 | 6/1923 | Busby ............................. 33/338 |
| 2,832,148 | 4/1958 | Rousse ........................... 33/144 |
| 3,334,593 | 8/1967 | Plasser et al. .................. 33/287 |

*Primary Examiner*—William D. Martin, Jr.
*Attorney, Agent, or Firm*—Kurt Kelman

[57] ABSTRACT

A mobile track surveying apparatus comprises two spaced-apart bogies. Track gage and superelevation measuring devices as well as track grade and lateral alignment measuring devices are mounted on the two bogies, the latter including a theodolite mounted on a carrier plate on one bogie and a target mounted on a carrier plate on the other bogie, the theodolite and target defining an optical reference line determining the grade and alignment of the track.

12 Claims, 6 Drawing Figures

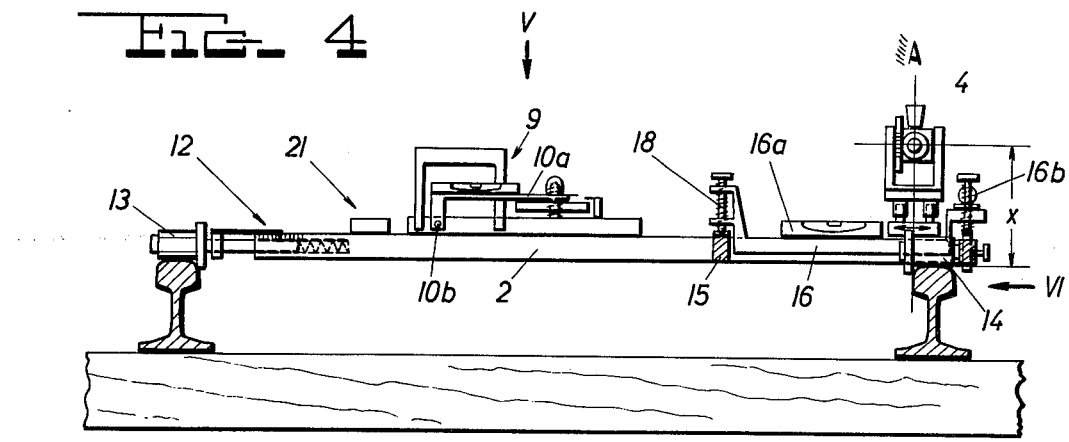
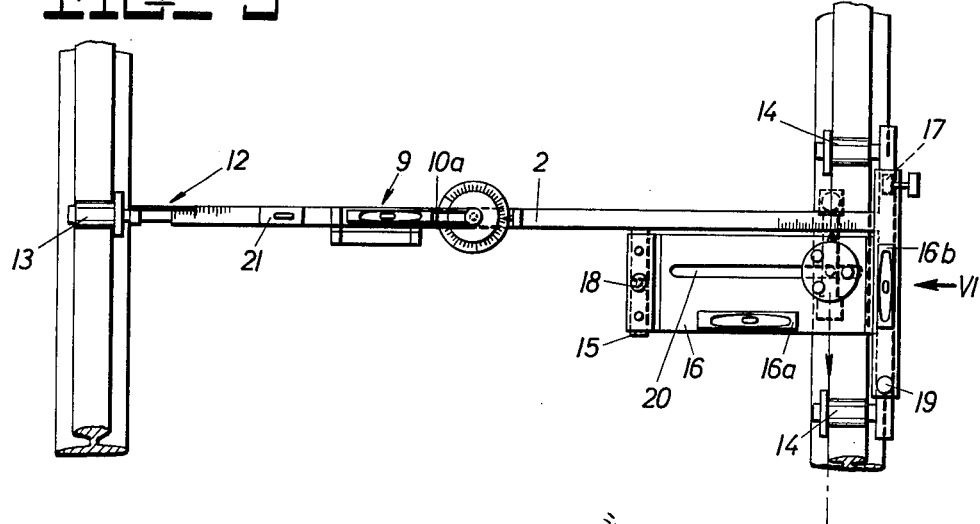
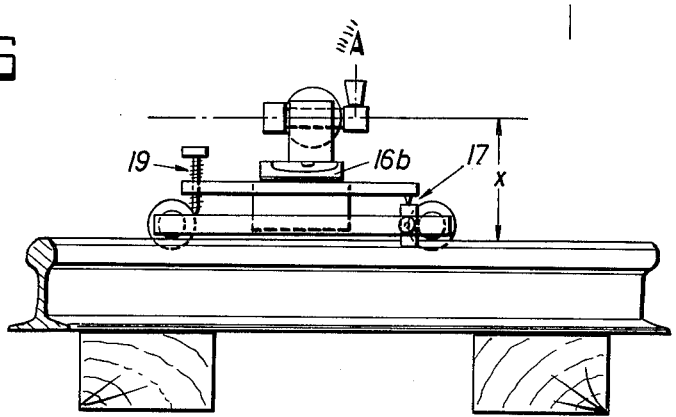

MOBILE TRACK SURVEYING APPARATUS

The present invention relates to a mobile track surveying apparatus for measuring the position of a track, including parameters indicating the grade, the lateral alignment, the gage and the superelevation of the track. Apparatus of this type includes bogies mounted on rollers or wheels for mobility on the track and mounting the track measuring means. If desired, means may further be provided for indicating and/or recording the measured parameters.

Conventional track surveying apparatus usually has been designed to measure only one or, at most, two track parameters. For instance, one such known track surveying apparatus makes it possible to measure the gage and superelevation of the track. The gage and superelevation may be read from suitably arranged scales and may be recorded on a tape. Usually, such track surveying devices are mounted on a frame or bogie having two or three rollers or wheels for moving on the track rails. They are used a great deal in laying or maintaining tracks. However, since their capacity is limited, different apparatus must be used for the accurate determination of the track position, i.e. apparatus which is capable of measuring the grade, the lateral alignment, the gage, the warp and the superelevation of the track. This involves a series of measurements since they cannot be executed simultaneously in view of the fact that the various measuring instruments interfere with each other. Labor costs in such track surveys are, therefore, excessive.

It is the primary object of this invention to provide a mobile track surveying apparatus which enables various track surveys required for renewing or maintaining a track to be effectuated simply and rapidly.

The above and other objects are accomplished according to the invention with a surveying apparatus comprising two bogies spaced apart along the track elongation and mounted on rollers for mobility on the track. Each bogie includes a vertically adjustable carrier plate. Track grade and alignment measuring means are mounted on the carrier plates, including a theodolite or transit mounted on the carrier plate of one of the bogies and a target mounted on the carrier plate of the other bogie, the theodolite and target defining an optical reference line determining the grade and the alignment of the track. Means for measuring the gage and superelevation of the track are also mounted on the bogies. The theodolite and target are preferably removably mounted on the respective carrier plates.

The above and other objects, advantages and features of the present invention will become more readily apparent from the following detailed description of a now preferred embodiment thereof, taken in conjunction with the generally schematic drawing wherein FIG. 1 is a side elevational view of the apparatus, with the two bogies at different spacings and in position to measure the track grade;

FIG. 4 is a like front elevational view of the other bogie carrying the theodolite;

FIG. 5 is a plan view of FIG. 4; and

FIG. 6 shows a side view of FIG. 4 in the direction of arrow VI.

Figure 1:
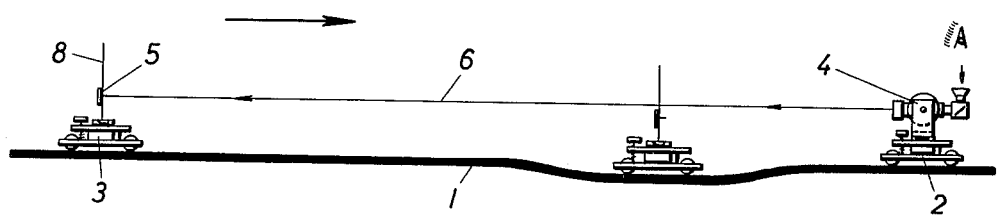
Figure 2:
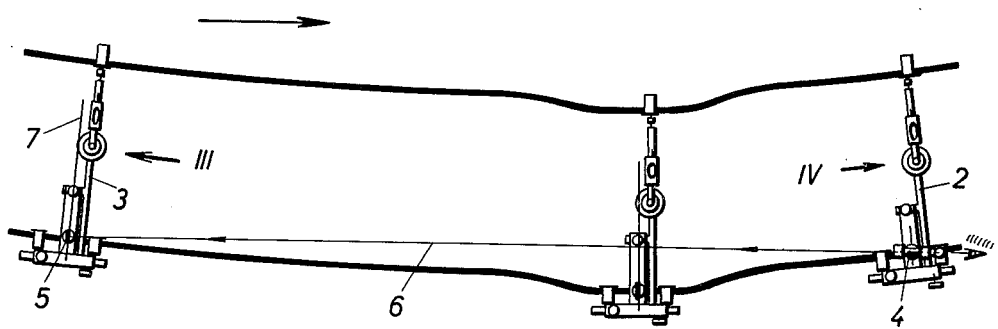
FIG. 2 is a plan view of the apparatus, in position to measure the track alignment.
Figure 3:
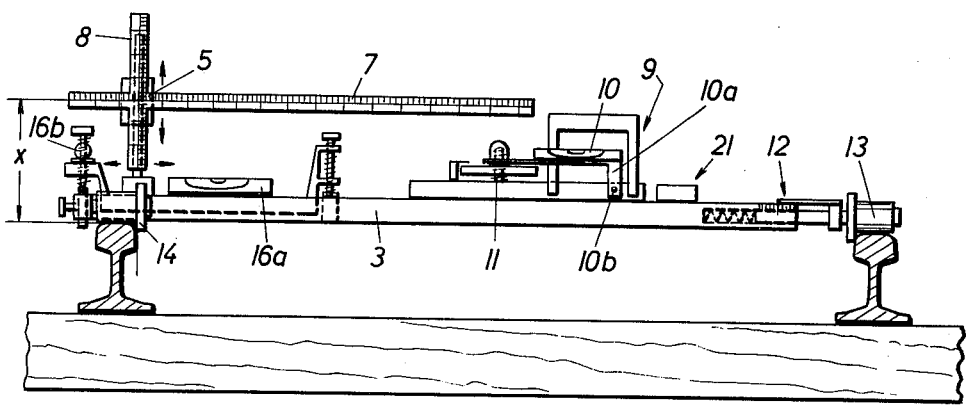
FIG. 3 is an enlarged front elevational view of one of the bogies carrying the target.

As shown in FIGS. 1 and 2, two bogies 2 and 3 are spaced apart along the elongation of track 1, bogie 2 carrying surveying transit or theodolite 4 while bogie 3 carries target 5 which has a hairline cross on which the theodolite is focussed to define optical reference line 6 determining the grade (FIG. 1) and the lateral alignment (FIG. 2) of the track. FIGS. 2 and 3 illustrate surveying bogie 3 in an intermediate position during a continuous track survey operation and this will be explained in detail hereinafter in connection with FIGS. 3 to 5.

Target 5 with its hairline cross is shown in detail in FIG. 3 and consists of two intersecting and perpendicularly arranged surveyor's rods 7, 8, vertical rod 8 serving to determine the track grade and horizontal rod 7 serving to determine the track alignment and any errors therein.

Means 9 for measuring the superelevation of track 1 is also mounted on bogie 3, this means consisting of spirit level 10. The spirit level is mounted on one arm of a mounting bracket 10a whose other arm, which is perpendicular to the one arm, is pivoted at 10b to the bogie for rotation about a fulcrum axis extending parallel to the center axis of the bogie in the direction of track elongation. The one arm of mounting bracket 10a cooperates with a micrometer setting screw 11, enabling the one arm to be pivoted in a vertical plane until it and the spirit level carried thereby are positioned substantially parallel to the track plane.

Means 12 for measuring the gage of the track is also mounted on the bogie, the operation thereof being explained hereinafter.

Bogies 2 and 3 are essentially identical and, in the illustrated embodiment, means 9 and 12 for measuring the superelevation and gage of the track are mounted on both bogies. As will appear more clearly from FIGS. 4 and 5 showing bogie 3, each bogie has a T-shaped frame supported by two rollers 14, 14 on one track rail while on roller 13 engages the other track rail. The part of the T-shaped frame extending across the track carries bracket 15 which is parallel to the part of the T-shaped bogie frame which extends in the direction of track elongation. Carrier plate 16 is vertically adjustably mounted on the bogie on bracket 15 and the latter bogie frame part. Three screw-threaded connecting elements 17, 18, 19 vertically adjustably mount carrier plate 16 on bracket 15 and the latter bogie part, respectively, so that the plate may be positioned parallel to the track plane. Furthermore, the carrier plate defines elongated mounting slot 20 extending transversely of the track elongation and receiving theodolite 4 and target 5, respectively, for horizontal adjustment thereof on the respective carrier plate in a transverse direction.

It will be noted that the bogies and carrier plates are not only identical but also that they are constructed of portable structural units consisting of the bogie frames with their mounting devices and the carrier plates. This enables the apparatus to be readily dismounted and transported in disassembled condition. Furthermore, the provision of two gage and superelevation measuring devices on the apparatus has the advantage that these parameters may be measured very rapidly so that the entire surveying operation may proceed at maximum speed. The provision of the triangulated adjustable mounting for the carrier plates enables the same to be properly leveled and supported in a level position.

Proper leveling of the carrier plate is facilitated by the mounting of two mutually perpendicularly arranged spirit levels 16a, 16b on each plate. As shown in detail in FIG. 6 screw-threaded connecting element 17 is a calibrated bolt vertically adjustably mounted in a screw-threaded bore in the bogie frame part which extends in the direction of track elongation. Screw-threaded connecting bolt 19 also vertically adjustably supports carrier plate 16 on this bogie frame part, bolt 19 being mounted in a screw-threaded bore in the carrier plate and engaging the bogie frame part with its conical tip while a conical support on the carrier plate engages the flat top of connecting bolt 19. The third screw-threaded connecting element 18 (FIG. 4) is a bolt mounted in screw-threaded bores in the carrier plate and resting in a groove engaged by the conical tip of bolt 18. Two vertical guide tracks on bracket 15 prevent carrier plate 16 from lateral displacement.

Track gage measuring means 12 on bogies 2, 3 comprises stub axle 22 which carries track rail engaging, flanged roller 13 and is telescopingly journaled in the transversely extending bogie frame part. A tapped bore in this bogie frame part carries compression spring 23 pressing against the stub axle and biassing flanged roller 13 into gaging engagement with the track rail. Rollers 14, 14 are similarly flanged for engagement with the opposite track rail, stub axle 12 carrying a pointer cooperating with a scale on the bogie track part so as to measure and indicate the track gage.

Odometers 21 are mounted on the bogies to measure and indicate the distance traveled by the bogies during the surveying operation.

The operation of the apparatus for measuring the various track parameters will partly by obvious from the above description of its structure and will be more fully explained hereinafter in connection with FIGS. 1 and 2.

Bogie 2 carrying theodolite 4 is held stationary on the track during surveying. Bogie 3 carrying target 5 is first spaced about 80 to 100 meters from bogie 2 and an optical reference or sight line 6 is established by focussing the theodolite on the hairline cross of the target, the theodolite being adjusted until it zeroes in on the target, thus giving a zero-zero reading for the track grade and track alignment. Simultaneously, the track gage and superelevation may be read on each bogie from devices 9 and 12.

As the survey operation proceeds, bogie 3 with target 5 is moved in the direction of the arrow in FIGS. 1 and 2 towards the theodolite. After the target has been properly leveled, the next measurement is effectuated, any grade variation being read from vertical surveyor's rod 8 and alignment variations being read from horizontal surveyor's rod 7, as well known in the surveying art. Again, simultaneous reading of the gage and superelevation parameters may be made by reading devices 9 and 12.

Several surveys are made sequentially at predetermined spacings between the two surveying bogies and the measured survey data may then be used to determine the exact track position. If desired, the survey values may be recorded on tapes or the like.

The apparatus of this invention makes it possible to measure simultaneously and with the same measuring bogies a plurality of track parameters, such as the grade, alignment, gage and superelevation in a single operation. This constitutes a considerable saving in machinery and time in track survey operations while, at the same time, increasing the accuracy thereof.

What is claimed is:
1. A mobile track surveying apparatus comprising
   1. only two bogies, the bogies being spaced apart along the track elongation and mounted on rollers for mobility on the track, each bogie including a vertically adjustable carrier plate,
   2. means for measuring the grade and means for measuring the lateral alignment of the track mounted on the carrier plates, the track grade measuring means and alignment measuring means including
      a. a theodolite mounted on the carrier plate of one of the bogies and
      b. a target mounted on the carrier plate of the other bogie, the theodolite and target defining an optical reference line determining the grade and the alignment of the track, and
   3. means for measuring the gage and means for measuring the superelevation of the track mounted on the bogies.
2. The mobile track surveying apparatus of claim 1, further comprising means for indicating the measured grade, means for indicating alignment, means for indicating the gage and means for indicating the superelevation of the track.
3. The mobile track surveying apparatus of claim 1, further comprising means for removably mounting the theodolite and target on the respective carrier plate.
4. The mobile track surveying apparatus of claim 1, wherein the means for measuring the gage and the means for measuring the superelevation of the track are mounted on the bogie carrying the target.
5. The mobile track surveying apparatus of claim 1, wherein the carrier plates define elongated mounting slots extending transversely of the track elongation and receiving the theodolite and target, respectively, for horizontal adjustment thereof on the respective carrier plate.
6. The mobile track surveying apparatus of claim 1, further comprising at least three mounting elements for accurately vertically adjustably mounting the carrier plate on the bogie.
7. The mobile track surveying apparatus of claim 6, wherein the mounting elements threadedly connect the carrier plate to the bogies for vertical adjustment in respect thereof.
8. The mobile track surveying apparatus of claim 1, wherein the two bogies and carrier plates are essentially identical and are constructed of portable structural units, the track gage and superelevation means being mounted on both bogies.
9. The mobile track surveying apparatus of claim 1, wherein each of the bogies has two rollers for engagement with one track rail and one roller for engagement with the other track rail.
10. The mobile track surveying apparatus of claim 1, further comprising odometer means mounted on at least one of the bogies.
11. The mobile track surveying apparatus of claim 1, further comprising two mutually perpendicularly arranged spirit levels on each of the carrier plates for leveling adjustment of the plates.
12. The mobile track surveying apparatus of claim 1, wherein the theodolite and the target are arraned for respectively measuring the grade and the lateral alignment of the track.

* * * * *